(12) United States Patent
Green et al.

(10) Patent No.: US 7,152,325 B2
(45) Date of Patent: Dec. 26, 2006

(54) POWERED TUBING CUTTER

(76) Inventors: Carroll D. Green, 2545 S. County Trail, West Kingston, RI (US) 02892; Duane C. Sherman, 2196 Post Rd., Wakefield, RI (US) 02879

( * ) Notice: Subject to any disclaimer, the term of this patent is extended or adjusted under 35 U.S.C. 154(b) by 177 days.

(21) Appl. No.: 10/963,609

(22) Filed: Oct. 14, 2004

(65) Prior Publication Data

US 2005/0076508 A1    Apr. 14, 2005

Related U.S. Application Data (60) Provisional application No. 60/510,524, filed on Oct. 14, 2003.

(51) Int. Cl.
*B26D 3/16*    (2006.01)
*B26B 27/00*    (2006.01)
(52) U.S. Cl. .............................. 30/101; 30/123.3; 30/97
(58) Field of Classification Search .................. 30/92, 30/93, 94, 95, 96, 97, 101, 102, 123.3, 500
See application file for complete search history.

(56) References Cited

U.S. PATENT DOCUMENTS

| | | | |
|---|---|---|---|
| 3,449,992 A | 6/1969 | Hanaway | 30/92 |
| 4,571,828 A * | 2/1986 | Miffitt | 30/123.3 |
| 4,953,292 A * | 9/1990 | Tobey | 30/97 |
| 5,243,760 A | 9/1993 | May | 30/101 |
| 5,315,759 A | 5/1994 | Mashata | 30/97 |
| 5,611,146 A | 3/1997 | Ducret | |
| 5,632,089 A | 5/1997 | Sakamoto et al. | 30/92 |
| 5,806,187 A | 9/1998 | Ducret | 30/92 |
| 6,205,897 B1 | 3/2001 | Carter | 30/92 |
| 6,336,270 B1 | 1/2002 | Dureiko | 30/102 |
| 6,553,669 B1 | 4/2003 | Carter | 30/92 |
| 6,581,499 B1 * | 6/2003 | Myers | 82/113 |
| 2005/0081388 A1 * | 4/2005 | Konen | 30/228 |
| 2005/0150113 A1 * | 7/2005 | Shultis | 30/101 |

FOREIGN PATENT DOCUMENTS

| | | |
|---|---|---|
| EP | 0 483 076 | 4/1992 |
| GB | 2 069 887 | 9/1981 |
| WO | WO 93/13901 | 7/1993 |

* cited by examiner

*Primary Examiner*—Hwei-Siu Payer
(74) *Attorney, Agent, or Firm*—Richard C. Litman (57) ABSTRACT

The powered tubing cutter is a hand held, mechanical device driven by a motor for cutting tubing/piping. The device comprises a housing, a drive plate, a main drive shaft, a cutting assembly having a cutting blade, a cam plate and a chain drive secured to a motor housing, having a handle, by a mounting bracket. The chain drive is powered by the motor, which causes the main drive shaft to rotate. The cutting assembly is pivotally secured to a pin on the main drive shaft. The pipe/tube to be cut is placed into the hole in the center of the housing and the main drive shaft. As the cutting assembly rotates with the main drive shaft the cam plate forces the cutting blade into cutting engagement with the tube/pipe.

20 Claims, 12 Drawing Sheets

POWERED TUBING CUTTER

CROSS-REFERENCE TO RELATED APPLICATION

This application claims the benefit of U.S. Provisional Patent Application Ser. No. 60/510,524, filed Oct. 14, 2003.

BACKGROUND OF THE INVENTION

1. Field of the Invention

The present invention relates to devices for cutting tubes and pipes, and more particularly to a hand held, motor powered tubing cutter that can be used to cut any length of pipe or tube.

2. Description of the Related Art

Plumbers, electricians, maintenance personnel and many other laborers often need to cut tubing or piping. Many times pipes or tubes are first run through the floor or a wall of a structure and then must be recut. For example, when plumbers put in baseboard heating the piping is run through the floor 1½ inches from the wall. Each one of the pipes then has to be recut. Conventionally, the plumber would recut the pipes by sitting on the floor with a small tubing cutter, measure each pipe and then cut each pipe. This is very time consuming because each cut takes several minutes. Another problem is that this method of cutting the pipes is very inaccurate because each pipe must be separately measured prior to cutting which will likely result in uneven cuts.

The following patent documents disclose conventional pipe cutting devices.

International Publication Number WO 93/13901 published on Jul. 22, 1993 discloses an implement for cutting thin walled pipes of sheet metal. The implement comprises an outer cutting ring having jaw clamps for centered holding of a pipe and with a rotating ring body that is driven by a motor. The ring body has holders for inwardly projecting spring loaded cutting wheels and an actuator means for forcing the cutting wheels against the pipe. When the ring body is rotated the cutting wheels will cross cut the pipe.

European Patent Application 0 483 076 discloses a super-rapid centrifugal system for the cutting and preparation of pipes. The pipe is inserted into a hole in the center of the apparatus. A metal ring is tightened around the pipe. A power source, through a chain drive, causes a blade to rotate around the pipe and cut through the pipe.

United Kingdom Patent Application Number GB 2 069 887 published on Sep. 3, 1981 discloses an apparatus for use in machining work pieces. The apparatus includes a machine having a drive motor. The machine is adapted to hold and rotatably drive a work piece or to drive one of the various tools that are connected to the machine. The various tools are held on the machine by a rotary clamp. The various tools include a tool carrier, a pipe cutter, a thread cutter, a vice, a die head, a circular saw, a cutting head, pipe bending equipment and pipe cleaning equipment.

U.S. Pat. No. 6,553,669 issued on Apr. 29, 2003, and U.S. Pat. No. 6,205,897 issued on Mar. 27, 2001 to Carter, S. W. disclose a pipe cutter including a reciprocating jigsaw with a motor. A work piece holder is slidably secured to a way that is clamped to the jigsaw. The work piece holder has a handle and a slot for receiving and holding the work piece. The pipe that is to be cut is placed in the slot and the holder is moved along the way toward the jigsaw blade. The jigsaw then cuts the pipe.

U.S. Pat. No. 6,336,270 issued on Jan. 8, 2002 to Dureiko, D. R. discloses a portable, hand held tube-cutting device. The tube-cutting device has a slot for receiving a tube or pipe to be cut. While in the holding slot, a motor driven cutter cuts the pipe or tube at a desired length.

U.S. Pat. No. 6,134,997 issued on Oct. 24, 2000 to Rosanova, R. P. discloses a tuber cutter. The hand held tool has a pair of gripper rollers and a cutter roller that hold the tube to be cut. An electric motor drives the gripper rollers and rotates the tube. A second motor powers the cutter to cut the tube held by the gripping rollers.

U.S. Pat. No. 5,806,187 issued on Sep. 15, 1998 to Ducret, L. C., U.S. Pat. No. 5,611,146 issued on Mar. 18, 1997 to Ducret, L. C. and U.S. Pat. No. 5,632,089 issued on May 27, 1997 to Sakamoto et al. each disclose cutting devices having clamping mechanisms for engaging the materials to be cut. Each of the devices discloses clamps for securing a tube or pipe to be cut. Once the tube or pipe is engaged by the clamping device the tube or pipe is cut by a saw blade.

U.S. Pat. No. 5,528,830 issued on Jun. 25, 1996 to Hansen, F. M. discloses a rotary cutting tool for cutting tubing. The tool has a rotatable cutting assembly adapted for mounting on the end of a tool body. The cutting assembly includes a rotatable base member having two support elements that support two cutting heads on the base member. Centrifugal force created by rotating the base member causes the cutting heads to pivot inwardly into cutting contact with the tubular member.

U.S. Pat. No. 5,315,759 issued on May 31, 1994 to Mashata, M. discloses a power driven pipe-cutting device comprising a frame with a handle portion at one end and an upper jaw portion at the other end. A cutting roller is rotatably supported in the upper jaw portion. A carriage is slidably mounted to the handle and a power driven roller is rotatably supported by the carriage. The carriage and the power driven roller form a lower jaw portion and a cutting space is defined between the lower jaw portion and the upper jaw portion.

U.S. Pat. No. 5,243,760 issued on Sep. 14, 1993 to May, Jr., M. R. discloses an adjustable gear driven tube cutter. A cutting head is rotatably mounted within a tool body wherein both define circular openings to enable tubing to be inserted perpendicularly into the tool. A cutting wheel is incorporated into the cutting head such that rotation of the cutting head causes the wheel to pass around the periphery of the tool.

U.S. Pat. No. 3,449,992 issued on Jun. 17, 1969 to Hanaway, C. D. discloses a manually held power driven pipe cutter. The device includes a frame having a clamping device for securing the work piece to be cut. A motor powers a rotary cutter that cuts through the work piece clamped in the device.

None of the above inventions and patents, taken either singly or in combination, is seen to describe the instant invention as claimed. Thus a powered tubing cutter solving the aforementioned problems is desired.

SUMMARY OF THE INVENTION

The powered tubing cutter is a mechanical device driven by a motor for cutting tubing such as copper or steel tubing. The device is hand held and portable, which allows it to be used anywhere. The device comprises an assembly of interconnected parts secured to a hand held device by a mounting bracket. The hand held device includes a frame having a handle portion and a trigger located adjacent the handle, a motor located inside of the frame and a motor drive shaft that extends outwardly from the frame.

The assembly of parts comprises a housing, a drive plate, a sprocket cover, a main drive shaft, a cutting assembly having a cutting blade, a cam plate and a sprocket and chain drive. The chain drive is powered by the motor in the hand held device. As the motor drive shaft rotates the chain drive causes the main drive shaft to rotate. The cutter arm is pivotally secured to a pin on the main drive shaft so that as the main drive shaft rotates the cutter moves accordingly. The main drive shaft extends out of a hole in the center of the housing. The cam plate is positioned between the wall of the housing and the main drive shaft. The pipe/tube to be cut is placed into the hole in the center of the housing and the main drive shaft. As the cutter arm, which holds the cutting blade, rotates with the main drive shaft the cam plate forces the cutting blade into contact with the tube/pipe so that the blade cuts through the tube/pipe.

The powered tube cutter may also include a cover that fits over the chain drive. The chain drive cover also has a depth-measuring device, which comprises a rod that may be locked into place at a certain length. Once the rod is locked into place multiple cuts may be made at the same length without having to measure prior to each cut. Also, a polishing device may be secured to the drive plate so that ends of the tubes/pipes may be polished after they are cut.

Accordingly, it is a principal object of the invention to provide a portable, hand held pipe/tube cutter that will increase production speed for plumbers, electricians or others having to cut piping/tubing.

It is another object of the invention to provide a pipe/tube cutter that can cut through any type of tube/pipe.

It is a further object of the invention to provide a pipe/tube cutter that can cut through any type of pipe/tube material in a few seconds.

Still another object of the invention is to provide a pipe/tube cutter that has an integrated measuring device so that a number of pipes/tubes may be cut at the same length without having to measure after each cut to improve cutting precision.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
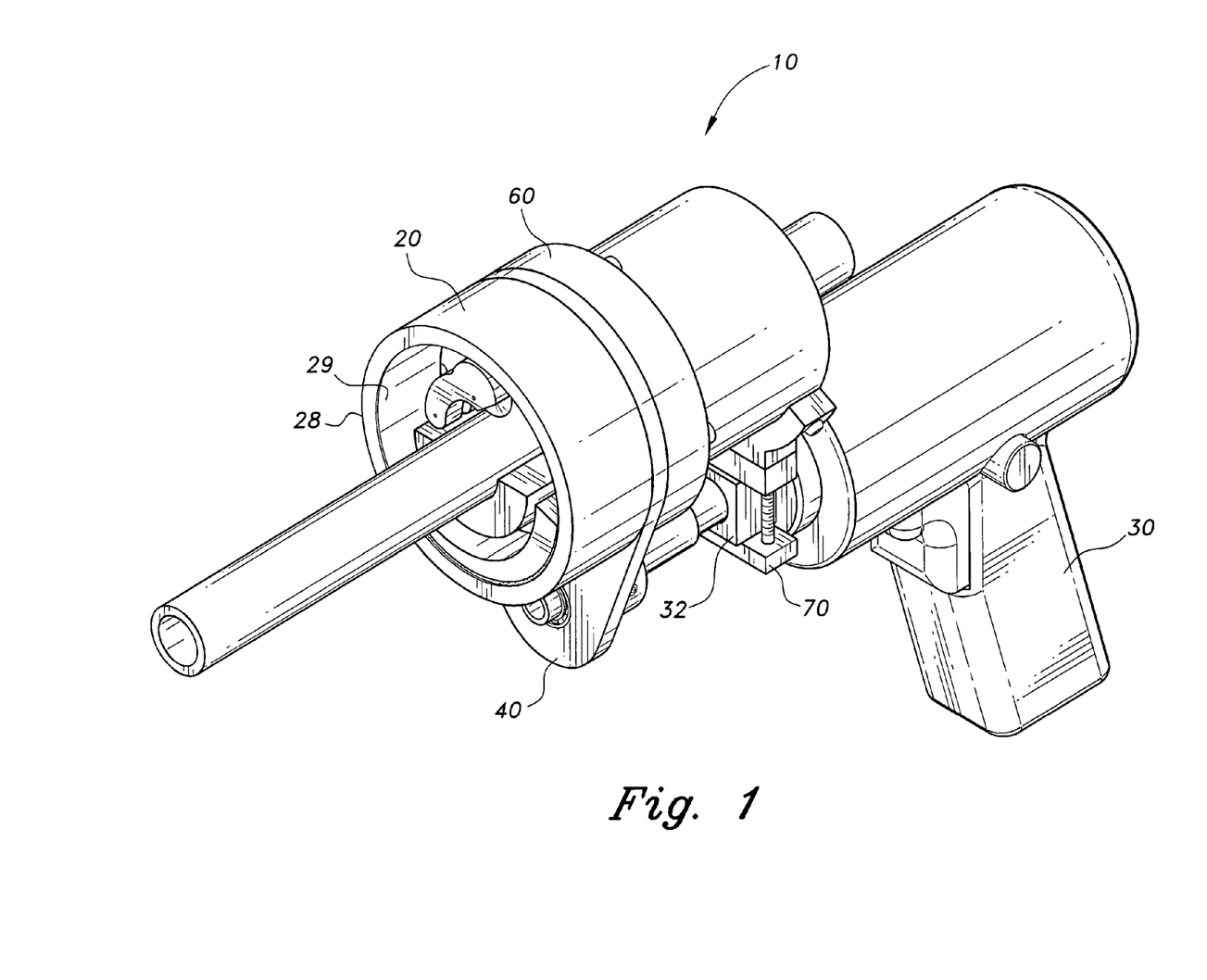
FIG. 1 is an environmental, perspective view of a powered tubing cutter according to the present invention.

The present invention is a powered tubing cutter that improves the speed of production for plumbers, electricians and the like. The powered tubing cutter is a mechanical device that is driven by a motor to cut piping/tubing made from any material including, but not limited to, copper and steel. FIG. 1 is an environmental perspective view of the powered tubing cutter 10. The powered tubing cutter 10 generally comprises a housing cap 20, a hand held motor case 30, a drive plate 40, a drive 50, a rear cover 60, a mounting bracket 70, a cam plate 90 (shown in FIGS. 2 and 3) and a cutting assembly 100 (shown in FIGS. 2 and 3).

Figure 3:
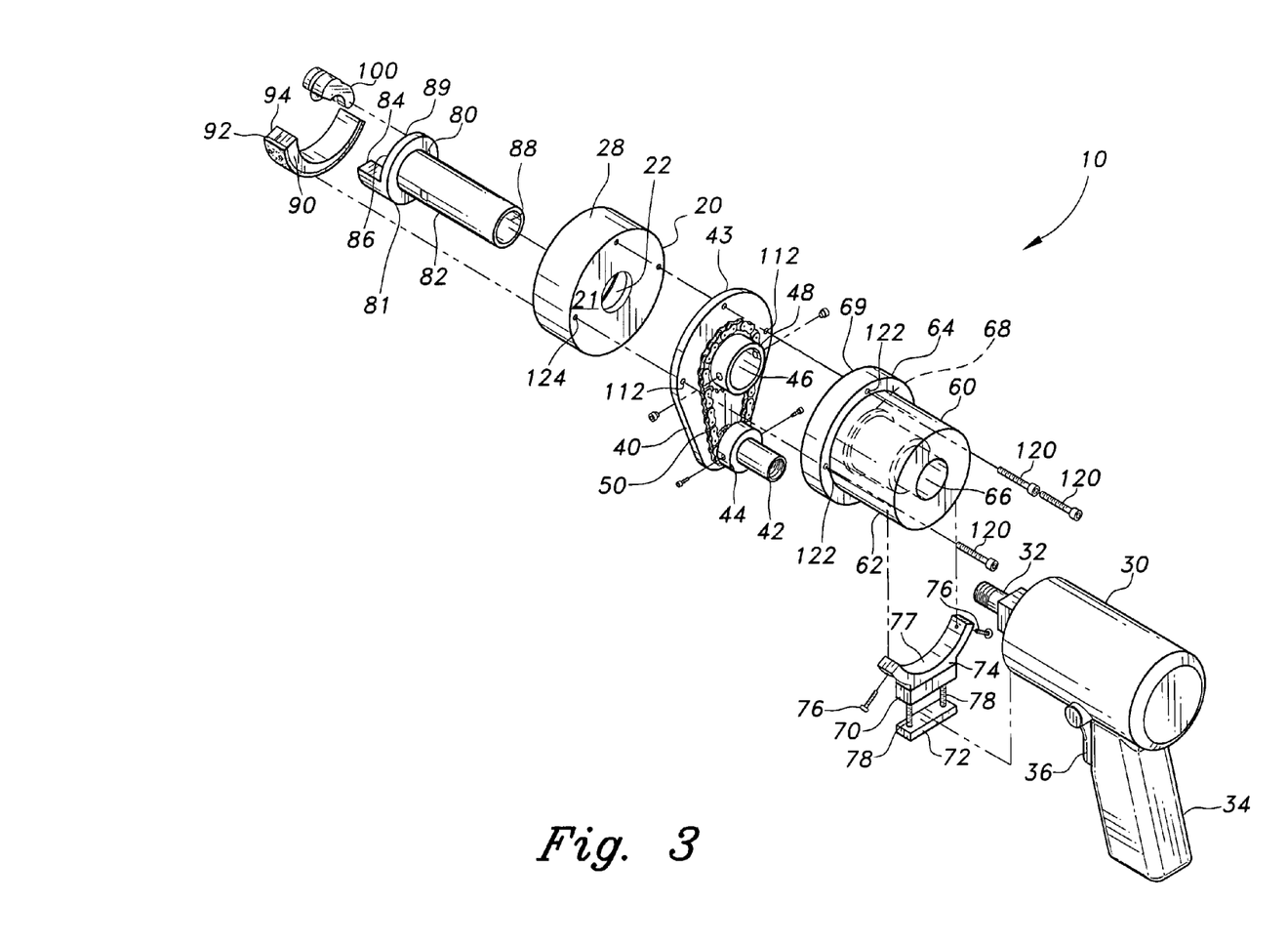
FIG. 3 is an exploded, perspective view of the powered tubing cutter.

FIG. 3 is an exploded perspective view of the cutter 10 depicting each of the individual parts and their location in the cutter 10 in relation to one another. The motor case 30 is a housing that encloses the electric motor that powers the cutter 10. The case 30 has a main body portion and a handle portion 34 disposed along the bottom of the case 30. The handle 34 allows a user to easily grip the cutter 10 with a single hand. A trigger 36 is positioned along the handle portion 34. The trigger 36 activates the cutter 30 when it is pressed by the user. A motor shaft 32 projects outward from the front of the case 30. When the motor is activated it causes the motor shaft 32 to rotate.

The motor shaft 32 is operatively coupled to a drive train disposed on the drive plate 40. The drive plate 40 comprises a generally flat main body having a small first rounded end 41 and a large second rounded end 43. A driven rotating hub, such as the sprocket 48 of the illustrated embodiment, having a center through hole 46, is disposed along the surface of the drive plate 40 at the second end 43. A bearing 44, having an extended shaft 42, is disposed along the surface of the drive plate 40 at the first end 41.

The extended shaft 42 of the bearing 44 engages the motor shaft 32. The extended shaft 42 may have an internally threaded axial bore for engagement with the motor shaft 32, or may be otherwise adapted to engage the motor shaft 32. It can be recognized that the motor case, motor shaft, motor, and handle may be embodied in the form of a conventional hand-held power tool such as a power drill or the like. In such an embodiment, the powered tubing cutter 10 is an accessory attachment for the hand-held power tool, with the extended shaft 42 of the bearing 44 adapted for engagement with a chuck or similar engagement of the hand-held power tool.

The drive 50 is disposed along the drive plate 40. The drive 50 may comprise any form of drive train or mechanism including, but not limited to, sprocket, chain, and belt drives and combinations thereof. The drive 50 shown in the illustrated embodiment in FIG. 3 is a chain drive. The chain drive 50 is secured around the bearing 44 and the sprocket 48, thereby driving the sprocket 48 from the rotation applied to bearing 44 by the motor shaft 32.

The main drive shaft 80 has a head portion 81 mounted onto an elongated cylindrical bottom portion 82. A center through hole 88 extends through the entire drive shaft 80. The head portion 81 comprises a first half 84, which is a semi-circular extension from the bottom portion, and a second half 86, which is a flat, semi-circular flange.

The rear cover 60 is secured to the drive plate 40 and covers the bottom portion 82 of the drive shaft 80 and the sprocket 48. The rear cover has a bottom portion 62 and a top portion 64 that is slightly wider than the bottom portion 62. The top portion 64 has a main surface 68 and an extended rim 69 that is disposed around a large portion of the main surface 68. The rear cover 60 includes a center through hole 66 that is adapted to receive the bottom portion 82 of the main drive shaft 80 after it extends through the sprocket through hole 46. The extended rim 69 on the main surface 68 of the rear cover 60 fits around the sprocket 48 and the chain drive 50. The extended rim 69 does not extend around the entire main surface 68 providing a space for the chain drive 50 to extend out of the rear cover 60 and extend across the drive plate 40 to the bearing 44.

The mounting bracket 70 is attached to the rear cover 60 and secures the rear cover 60, and the rest of the powered tubing cutter assembly 10, to the motor case 30. The mounting bracket 70 comprises an upper main body 74 and a lower clamping portion 72. The upper main body 74 has a curved top portion 77 that is shaped to conform to the rear cover 60. The curved top portion 77 fits around the rear cover 60 and is secured in place by fasteners 76 that are located on either end of the curved top portion 77. The lower clamping portion 72 secures the mounting bracket 70 to the motor shaft 32. The motor shaft 32 is positioned between the bottom clamping portion 72 and the upper main body 74. Fasteners 78 are located at either end of the lower clamping portion 72 for securing the lower clamping portion 72 to the upper main body 74. The mounting bracket 70 allows the motor case 30 to be easily removed from or secured to the rest of the powered tubing cutter 10.

The housing 20 is attached to the drive plate 40 on the surface opposite the rear cover. The housing 20 is adapted to protect the cutting assembly 100, the cam plate 90 and the head portion 81 of the drive shaft 80. The housing 20 has a bottom mounting surface 21 and a top open surface 24 (shown in FIG. 2). The bottom mounting surface 21 is mounted to the drive plate 40. The housing 20 further comprises a center through hole 22 that is adapted to receive the bottom portion 82 of the main shaft 80.

The cam plate 90 is located inside of the housing 20. The cam plate 90 has a tapered and curved main body 94 having an inner surface and an outer surface 92. The outer surface 92 is a coating or layer of a friction reducing material. Alternatively, the entire main body 94 may be formed of the friction reducing material. The friction reducing material may be any suitable friction reducing material including, but not limited to, Teflon, nylon, Delron or oilite. The cam plate 90 is locate inside of the housing and releasably disposed along the bottom surface 21 of the housing 20 between the inner surface 29 of the side wall 28 of the housing 20 and a mounting lip 26 (shown in FIG. 2) that is disposed around the center through hole 22, such that the cam plate 90 is free to slide along the inside surface 29 of the side wall 28.

Figure 5:
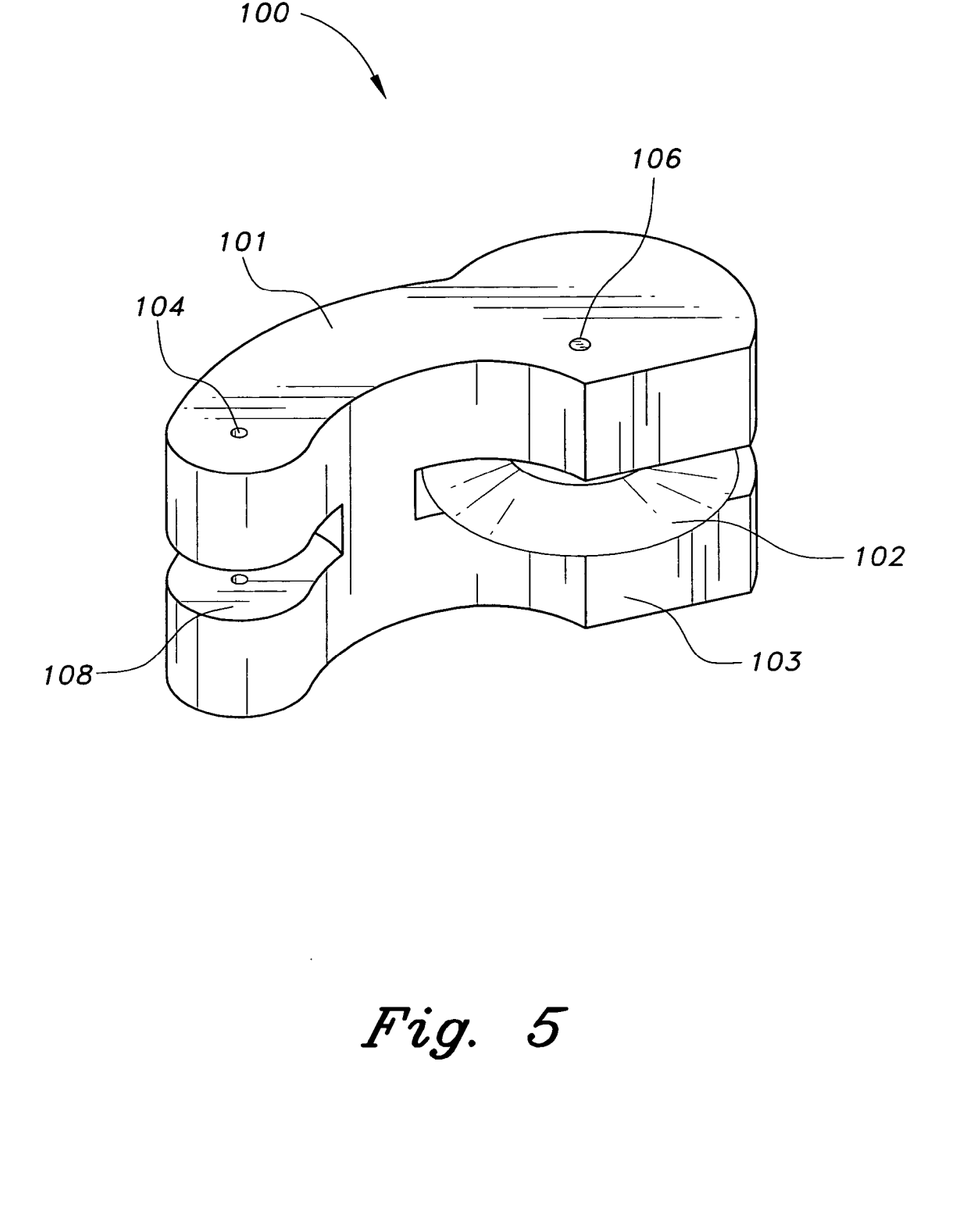
FIG. 5 is a perspective view of the cutting blade.
Figure 6:
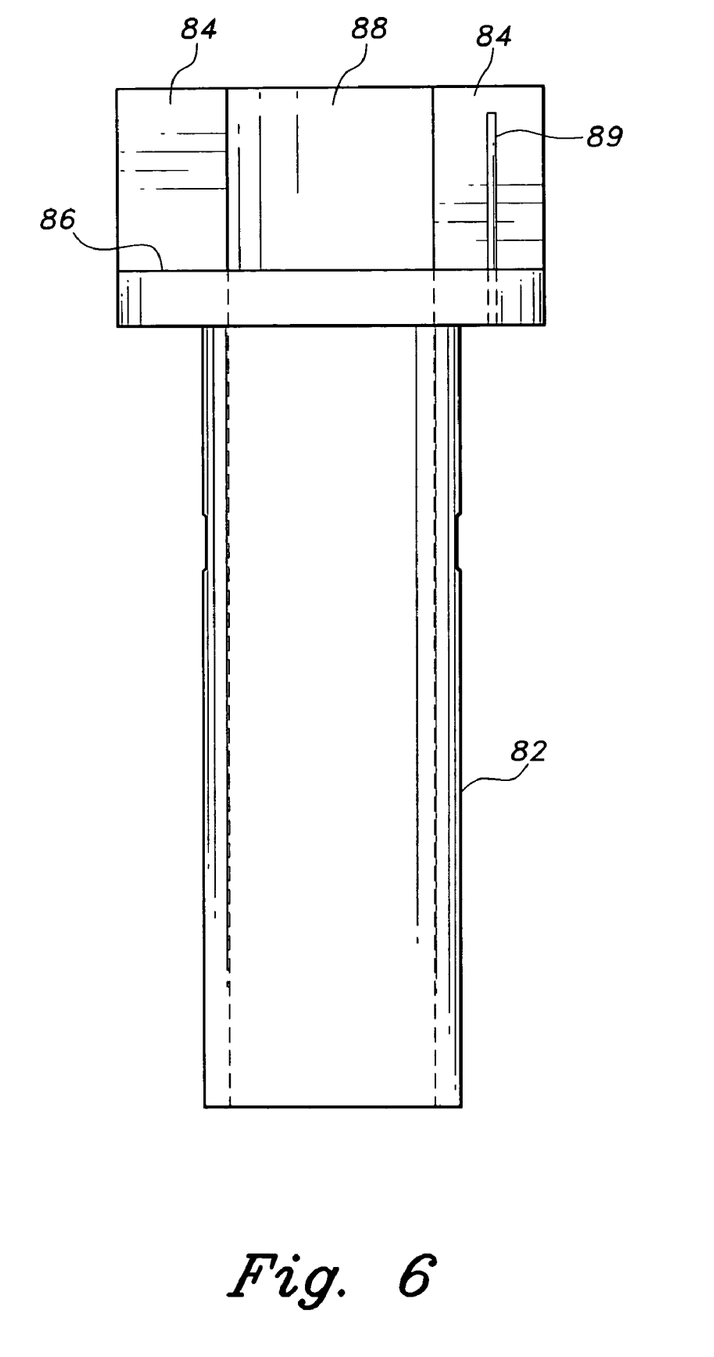
FIG. 6 is a top view of the main shaft of the powered tubing cutter.

The cutting assembly 100 is secured to the head portion 81 of the main shaft 80 that is located inside the open end 24 of the housing 20. FIG. 5 is an enlarged perspective view of the cutting assembly 100. The cutting assembly 100 comprises a top arm 101 and a bottom arm 103 defining an open space 108 between them. The cutting assembly 100 further comprises a cutting blade 102 mounted between the top arm 101 and the bottom arm 103. The cutting blade 102 is secured between the cutting arms 101, 103 by a pin fastener 106 that extends through the two cutting arms 101, 103 and through the center of the cutting blade 102. In the illustrated embodiment, the cutting blade 102 is a cutting wheel that is rotatably mounted about the pin fastener 106. A mounting hole 104 extends through the top arm 101 and the bottom arm 103 for pivotally mounting the cutting assembly 100 to the main shaft 80. As shown in FIG. 6, the main shaft 80 has a pivot pin 89 disposed on the head portion 81 of the main shaft 80. The pivot pin 89 extends through the mounting holes 104 to secure the cutting assembly 100 to the main shaft 80. The cutting assembly 100 thus is oriented so that the cutting blade 102 is transversely aligned with the center through hole 88 of the main shaft 80.

The housing 20, the drive plate 40 and the rear cover 60 are secured to one another by a plurality of fasteners 120. The fasteners may be any suitable type of fastener, but are preferably threaded fasteners or bolts. As shown in FIG. 3 the fasteners 120 extend through a plurality of fastener receiving holes 122 disposed along the top portion 64 of the rear cover 60 and the large rounded end 43 of the drive plate 40. The fasteners 120 are then engaged by threaded holes 124 that are disposed along the bottom surface 21 of the housing 20.

Figure 2:
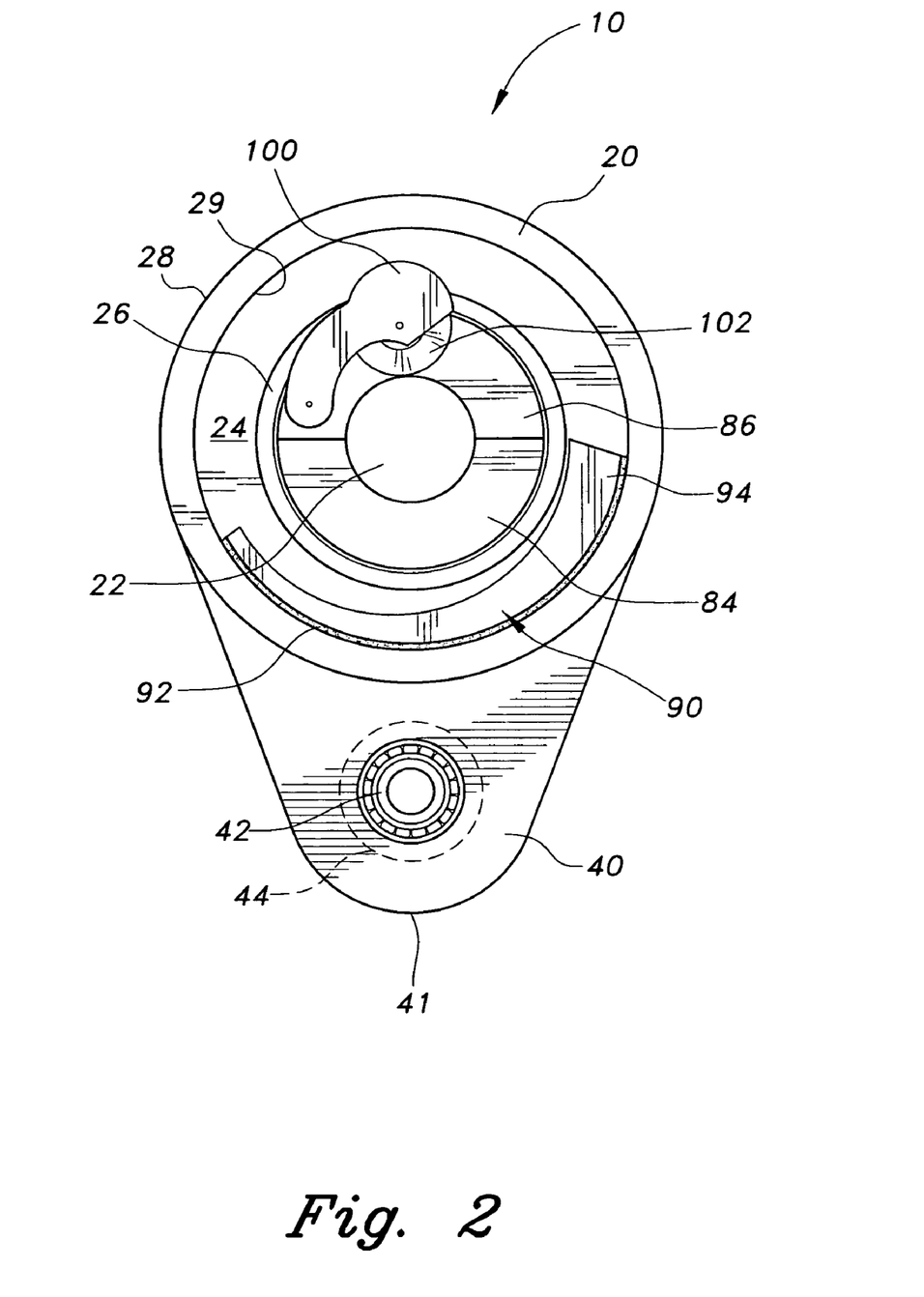
FIG. 2 is a front view of the powered tubing cutter.
Figure 4:
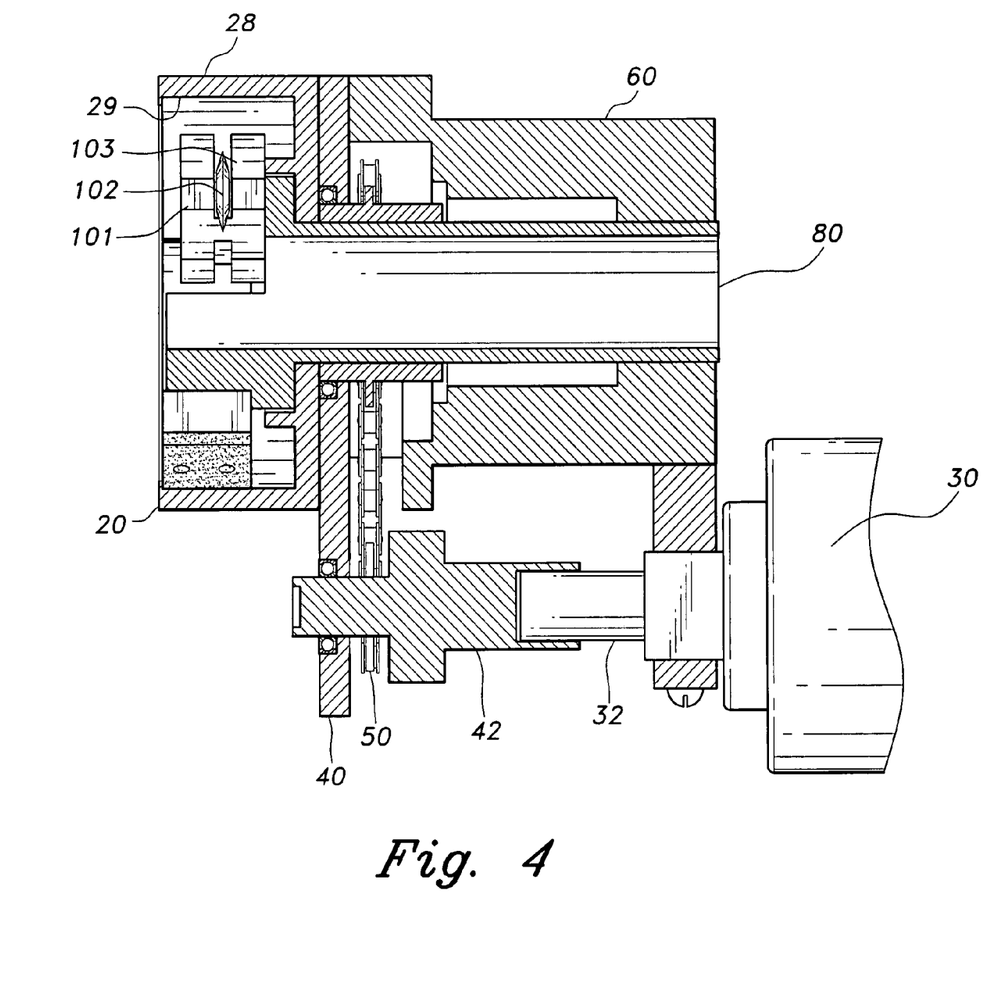
FIG. 4 is a top, cross-sectional view of the powered tubing cutter.

FIG. 4 is a cross sectional view of the powered tubing cutter 10 showing all of the parts interconnected to one another. The main shaft 80 extends through the center through hole 22 of the housing 20, the drive plate 40 and the rear cover 60. The head portion 81 of the main shaft 80 is positioned inside of the housing 20 above the center through hole 22. As shown in FIG. 2, the cam plate 90 is held in place between the side wall 28 of the housing 20 and the retaining lip 26, such that the cam plate 90 is free to slide along the inside surface 29 of the side wall 28. The cutting assembly 100 is pivotally secured to the flat head portion 86 of the main shaft 80 directly above the center through hole 22.

To operate the powered tubing cutter 10 the user first positions a pipe/tube into the center through hole 22 of the housing 20. The pipe/tube will extend through the center through hole 88 of the main shaft 80, which extend through the drive plate 40 and the rear cover 60. Once the pipe/tube is positioned inside of the cutter 10 the user presses the trigger 36 on the motor case 30, which actuates the motor housed inside of the motor case 30. The power from the motor turns the motor shaft 32, which then causes the chain drive 50 to turn. The turning chain drive 50 forces the main shaft 80 to rotate. As the main shaft 80 rotates the cutting assembly 100 rotates accordingly with the main shaft 80.

As shown in FIG. 2, when the cutting assembly 100 rotates it contacts the cam plate 90. As the cutting assembly 100 moves along the cam plate 90, the cam plate 90 urges the cutting assembly 100 inward, pressing the cutting blade against a length of pipe or tubing placed within the powered tubing cutter 10. At the same time, the outer surface 92 of the cam plate 90 is pressed against the inner surface 29 of the side wall 28 of housing 20, increasing friction between the outer surface 92 of the cam plate 90 and the inner surface 29 of the side wall 28. The friction forces the cam plate 90 tighter against the cutting assembly 100, increasing the pressure of the cutting blade 102 against the pipe/tube. As the cutting blade 102 cuts the pipe/tube the cutting assembly 100 continues to rotate and the cam plate 90 forces the cutting blade 102 through the entire thickness of the pipe/tube.

Figure 11A:
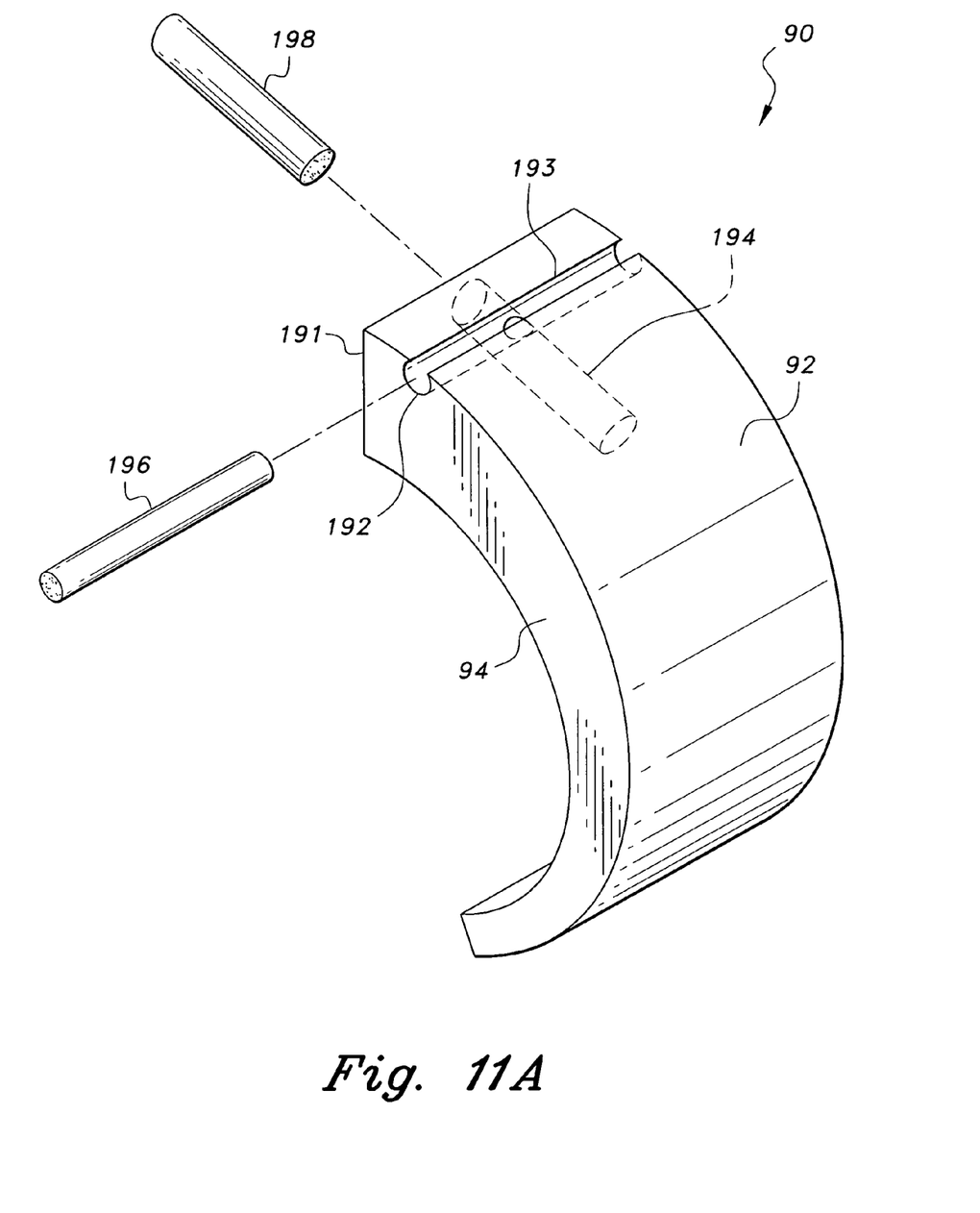
FIG. 11A is an exploded perspective view showing an oil reservoir and oil applicator in a cam plate of the powered tubing cutter.
Figure 11B:
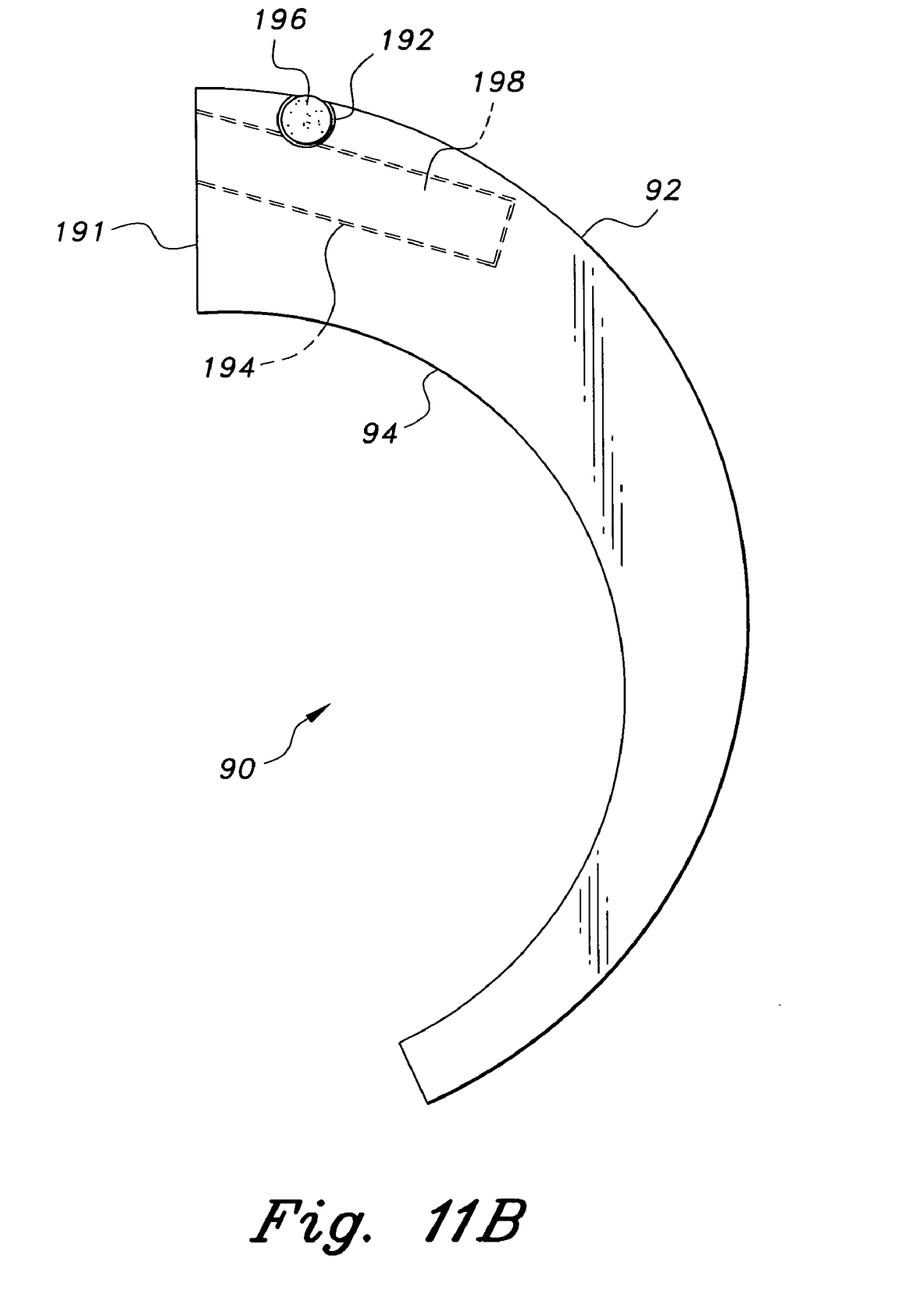
FIG. 11B is a side view of the cam plate shown in FIG. 11A.

Lubrication of the outer surface 92 of the cam plate 90 provides for more consistent friction between the cam plate 90 and the cutting assembly 100. Referring to FIGS. 11A and 11B, an oil reservoir 194 and oil applicator 196 are shown. Oil reservoir 194 is a cavity formed into the main body 94 of the cam plate 90. The oil reservoir 194 is formed in a leading edge face 191 of, and extends into, the main body 94. An applicator channel 192 is formed in the main body 94 and adjacent to the outer surface 92. The applicator channel 192 is a round channel extending transversely across the cam plate 90, and having an open slot 193 at the outer surface 92. The applicator channel 192 intersects the oil reservoir 194. In use, an oil carrier 198 such as an oil-saturated piece of felt is inserted into the oil reservoir 194, and an oil applicator 196, such as a small strip of felt, is inserted into the applicator channel 192 such that oil from the oil carrier 198 is wicked by the oil applicator 196 to lubricate the outer surface 92 of the cam plate 90.

Figure 7:
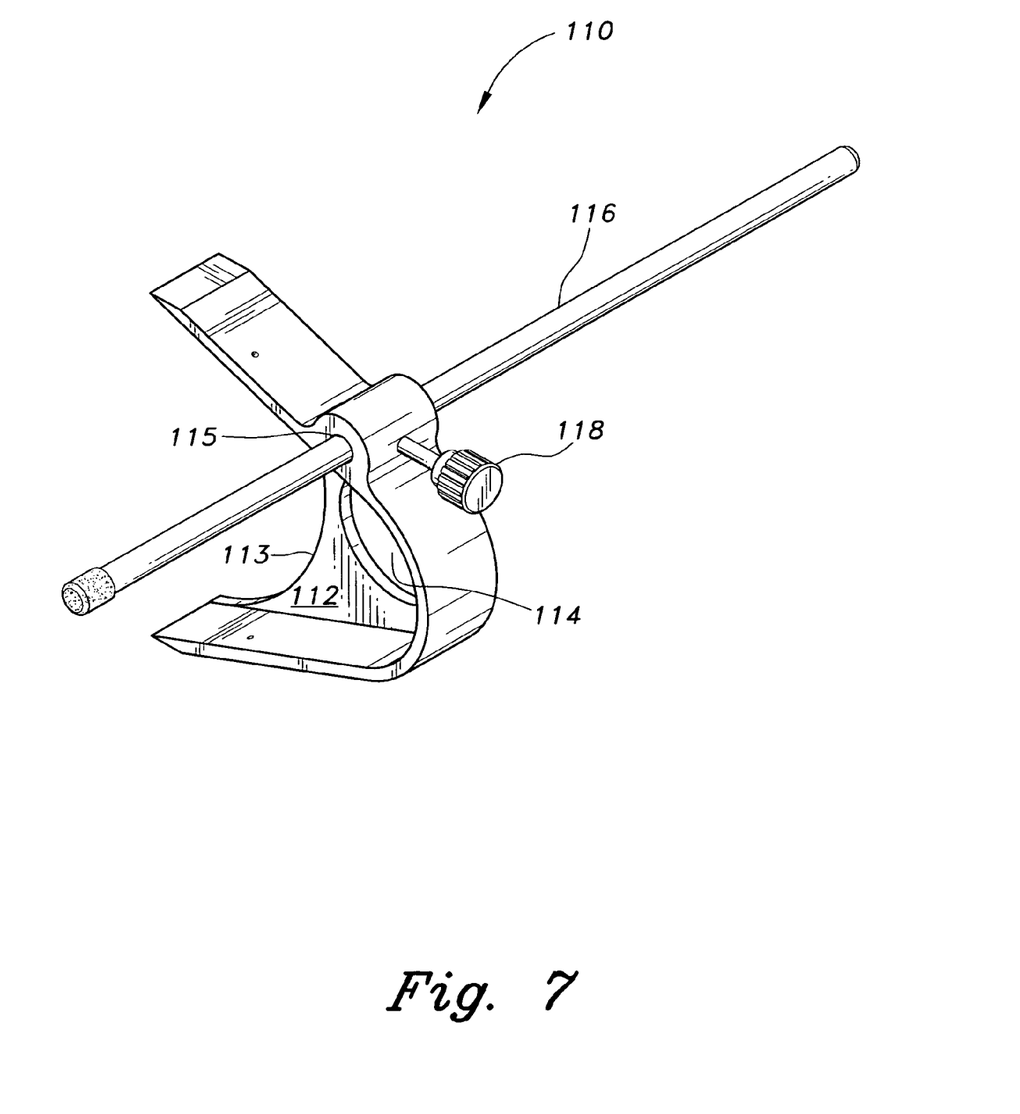
FIG. 7 is a side perspective view of a chain drive cover for mounting onto the powered tubing cutter.

The powered tubing cutter 10 may also include a drive cover 110. FIG. 7 is a perspective view of the drive cover 110. The drive cover 110 is adapted to secure to the smaller rounded end 41 of the drive plate 40. The drive cover 110 has a main body 112 with a curved mounting portion 113 that is shaped consistently with the smaller rounded end 41 of the drive plate 40. A through hole 114 is disposed along the main body 112 of the cover 110. The through hole 114 allows the motor shaft 32 to extend through the drive cover 110.

The drive cover 110 further comprises a depth-measuring rod 116 that extends through a mounting hole 115. The rod 116 is locked into place at a desired length by a locking knob 118. Once the measuring rod 116 is locked into place the cutter 10 can cut a number of pipes/tubes at the same length without having to measure each individual pipe/tube. This improves the precision of the user's cuts by insuring that each pipe/tube will be cut at the same length.

Figure 8:
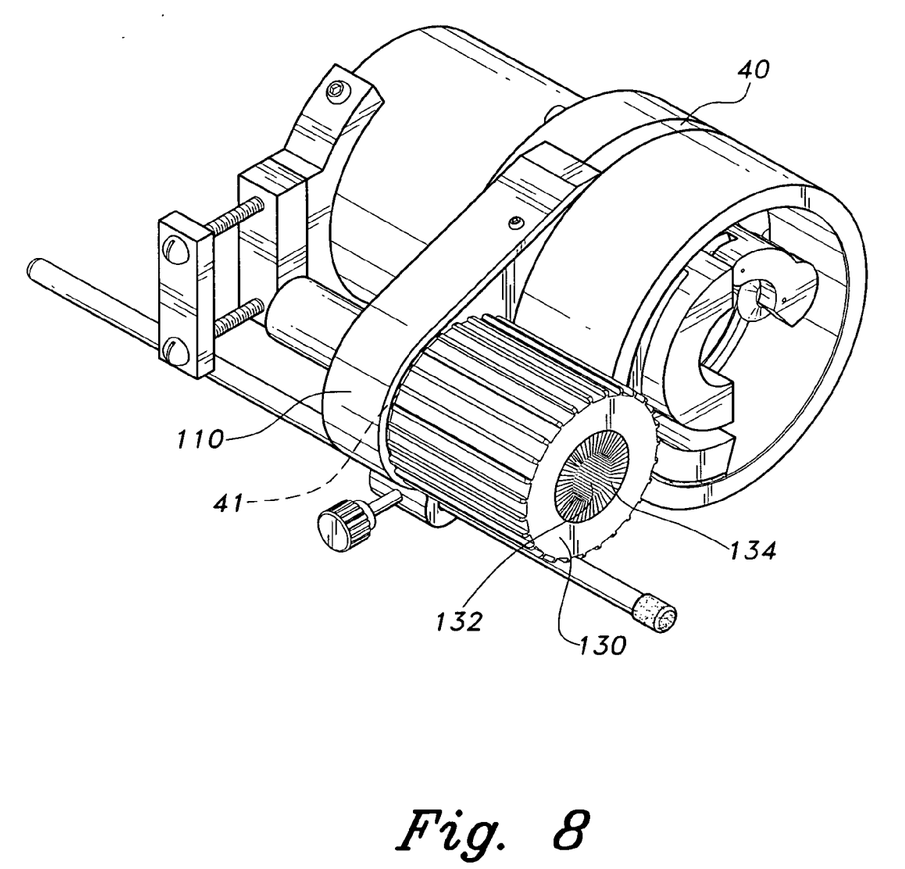
FIG. 8 is a perspective view of the powered tubing cutter with the chain drive cover and a polishing device secured thereon.

FIG. 8 is a perspective view of an embodiment of the powered tubing cutter 10 with the additional feature of a polishing device 130. The polishing device 130 is secured to an extended shaft that extends through the bearing 44 on the drive plate 40. The polishing device 130 comprises a center hole 132 that is lined with bristles 134. Once the pipe/tube is cut, the cut end is inserted into the center hole 132. The rotating bristles 134 polish the cut end of the pipe/tube.

Figure 9A:
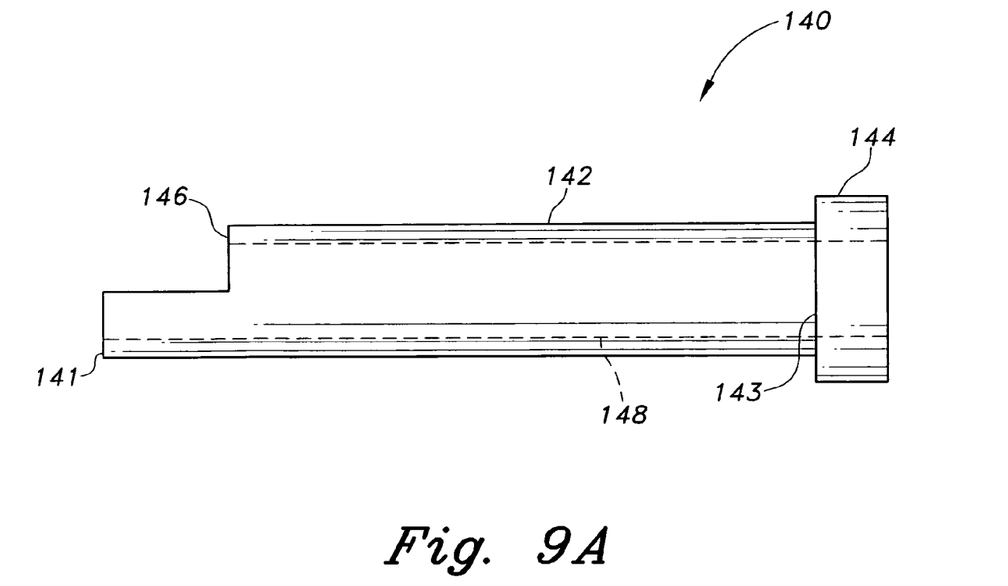
FIG. 9A is a side view of a liner tube.
Figure 9B:
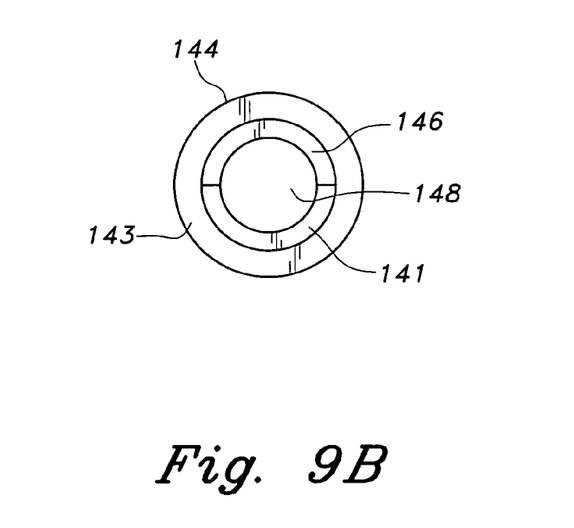
FIG. 9B is an end view of the liner tube.
Figure 10:
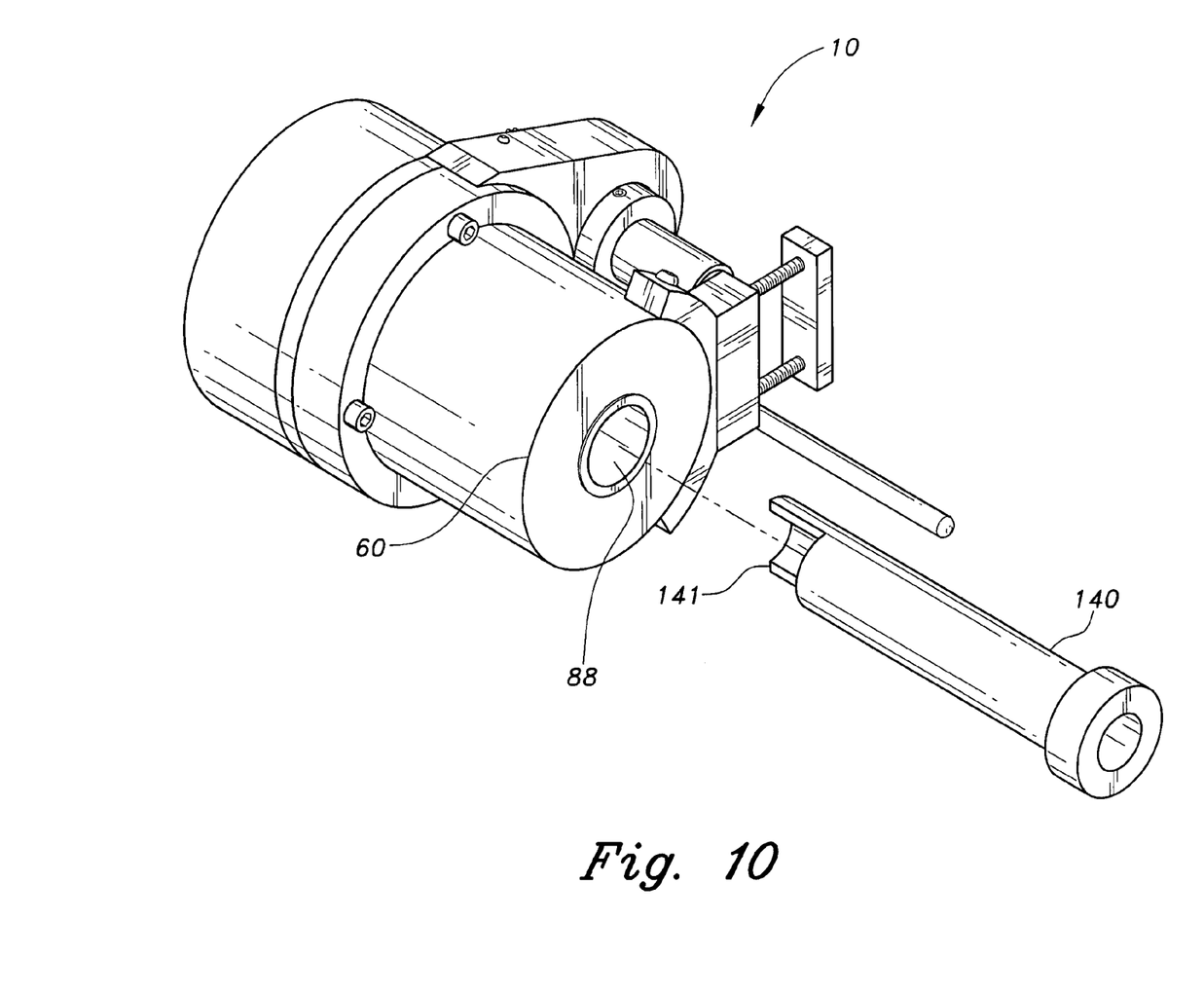
FIG. 10 is an exploded perspective view of the powered tubing cutter showing the attachment of the liner tube.

FIGS. 9A and 9B show an additional element of the powered tubing cutter 10. The powered tubing cutter 10 further comprises a liner tube 140. The liner tube 140 has a main shaft portion 142 with an insertion end 141 and a tube receiving end 143. A head portion 144 is disposed along the tube receiving end 143. The insertion end 141 has a notch 146 disposed thereon for accommodating the cutting assembly 100. The insertion end 141 of the liner tube 140 is inserted into the center through hole 88 and the head portion 144, which is wider than the main shaft portion 142, prevents the liner tube 140 from completely sliding through the center through hole 88. As shown in FIG. 9B, the liner tube has a center passage 148 that is adapted for receiving a pipe/tube. As shown in FIG. 10, the liner tube is inserted into the center through hole 88 of the powered tubing cutter 10. The liner tube 140 is used to adjust the tubing cutter 10 for different sized tubing.

It is to be understood that the present invention is not limited to the embodiments described above, but encompasses any and all embodiments within the scope of the following claims.

We claim:

1. A powered tubing cutter, comprising:
   a drive plate having a top surface, a bottom surface, a first end, a second end, a rotating hub with a through hole disposed on the first end, and a bearing having an axially extending shaft disposed on the second end;
   a drive operably connecting the rotating hub and the axially extending shaft;
   a housing disposed on the top surface of said drive plate having a cylindrical side wall, the cylindrical side wall having an inner surface, the inner surface defining an inside radius;
   a main drive shaft having a head portion, a bottom end and a center through hole, the bottom end extending through the through hole in said rotating hub and into said housing;
   a cutter arm having a first end and a second end, the first end being pivotally secured to the head portion of the main drive shaft;
   a cutting blade disposed on the second end of the cutter arm; and
   a cam plate disposed within said housing between said main drive shaft and the inner surface of said side wall, the cam plate having a first end and a second end and an outer surface.

2. The powered tubing cutter according to claim 1, wherein said cam plate has a thickness that tapers from said first end to said second end.

3. The powered tubing cutter according to claim 1, wherein said cam plate is made from a friction reducing material.

4. The powered tubing cutter according to claim 1, wherein the outer surface of said cam plate is curved.

5. The powered tubing cutter according to claim 4, wherein said outer surface has a radius of curvature substantially equal to said inside radius.

6. The powered tubing cutter according to claim 4, wherein said outer surface is coated with a friction reducing material.

7. The powered tubing cutter according to claim 1, wherein said cam plate has an oil applicator disposed therein and exposed at said outer surface.

8. The powered tubing cutter according to claim 7, wherein said cam plate has an oil reservoir defined therein, the oil reservoir being in fluid communication with said oil applicator.

9. The powered tubing cutter according to claim 1, wherein said cutting blade is a cutting wheel rotatably attached to said cutter arm.

10. The powered tubing cutter according to claim 1, wherein said cutting blade is transversely aligned with the center through hole of said main shaft.

11. A powered tubing cutter, comprising:
    a motor case having a main body portion;
    a motor disposed inside of said motor case, the motor having a shaft extending forward from said motor case;
    a drive plate having a top surface, a bottom surface, a first end, a second end, a rotating hub with a through hole disposed on the first end, and a bearing having an axially extending shaft disposed on the second end, the axially extending shaft being coupled to the shaft of said motor;
    a drive operably connecting the rotating hub and the axially extending shaft;
    a housing disposed on the top surface of said drive plate having a cylindrical side wall, the cylindrical side wall having an inner surface, the inner surface defining an inside radius;
    a main drive shaft having a head portion, a bottom end and a center through hole, the bottom end extending through the through hole in said rotating hub and into said housing;

a cutter arm having a first end and a second end, the first end being pivotally secured to the head portion of the main drive shaft;

a cutting blade disposed on the second end of the cutter arm; and a cam plate disposed within said housing between said main drive shaft and the inner surface of said side wall.

12. The powered tubing cutter according to claim 11, wherein said cam plate has a thickness that tapers from a first end of said cam plate to a second end of said cam plate.

13. The powered tubing cutter according to claim 11, wherein said cam plate is made from a friction reducing material.

14. The powered tubing cutter according to claim 11, wherein the outer surface of said cam plate is curved.

15. The powered tubing cutter according to claim 14, wherein said outer surface has a radius of curvature substantially equal to said inside radius.

16. The powered tubing cutter according to claim 14, wherein said outer surface is coated with a friction reducing material.

17. The powered tubing cutter according to claim 11, wherein said cam plate has an oil applicator disposed therein and exposed at an outer surface of said cam plate.

18. The powered tubing cutter according to claim 17, wherein said cam plate has an oil reservoir defined therein, the oil reservoir being in fluid communication with said oil applicator.

19. The powered tubing cutter according to claim 11, wherein said cutting blade is a cutting wheel rotatably attached to said cutter arm.

20. The powered tubing cutter according to claim 11, wherein said cutting blade is transversely aligned with the center through hole of said main shaft.

* * * * *